Patented June 1, 1954 2,680,109

UNITED STATES PATENT OFFICE 2,680,109

ALLYL-2,3-EPOXYBUTYRATE

Henry C. Stevens and Frederick E. Kung, Akron, Ohio, assignors, by mesne assignments, to Columbia-Southern Chemical Corporation, Pittsburgh, Pa., a corporation of Delaware No Drawing. Application February 28, 1947, Serial No. 731,698

2 Claims. (Cl. 260—78.3)

This invention is concerned with certain novel polymers and to novel methods of polymerization. In accordance with the present invention novel polymers which are relatively insoluble in usual organic solvents have been produced by polymerization of compounds which contain a polymerizable unsaturated group and an ethylene oxide or 1,2 epoxy group. The term "ethylene oxide group" or "1,2 epoxy group" refers to the group

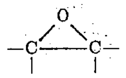

where the carbon atoms of the group are non-carbonylic and compounds containing this group are frequently referred to herein as "1,2 epoxides." Novel intermediate polymers which are capable of conversion to a substantially insoluble and/or infusible state also have been produced according to this invention.

As a further embodiment of the invention, certain novel and highly advantageous processes of polymerizing compounds which contain a single polymerizable ethylene oxide group or 1,2 epoxy group of the type above specified and one or more polymerizable unsaturated group or vice versa have been developed. According to one embodiment of these processes a compound of this type is treated to polymerize the epoxy group to form a polymer which is essentially thermoplastic and soluble in usual organic solvents while leaving at least a major portion of the unsaturated groups unpolymerized and polymerizing the unsaturated groups in a later operation. A further stepwise process has been provided according to this invention wherein the unsaturated group is polymerized leaving at least a major portion of the epoxy groups in the polymer unpolymerized and thereafter the epoxy groups are polymerized. Such processes are valuable since they afford valuable means of producing intermediate polymers which have greater solubility or fusibility and formability than the final polymer (the intermediate polymer usually being in the form of a soluble fusible or insoluble fusible stage). These intermediate polymers may be cured to a final stage of polymerization after the intermediate polymers have been shaped or otherwise processed to the desired form or physical state.

The intermediate polymers produced by the above processes are polymers of unsaturated 1,2 epoxides which contain a polymerizable ethylene oxide of 1,2 epoxy group, and a polymerizable unsaturated group wherein but one of said groups is polymerized at least to appreciable degree.

Two classes of these polymers may be prepared. One class of intermediate polymer is that which is obtained by polymerization of the epoxy group of the compound, leaving the unsaturated group thereof essentially unpolymerized. A second class of intermediate polymer is that which is obtained by polymerization of the unsaturated group leaving the epoxy group essentially unpolymerized.

Polymers of the first named class are polyunsaturated polyethylene oxide type polymers of the unsaturated 1,2 epoxides herein contemplated. Many of these polymers have the skeleton

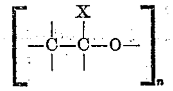

where $n$ denotes the degree of polymerization (number of ether units in the molecule which is usually greater than 5 and frequently 10 or more), and X is an unsaturated group which is linked to one of the ether carbon atoms through a carbon atom which is next to an ether carbon atom. For example X may be

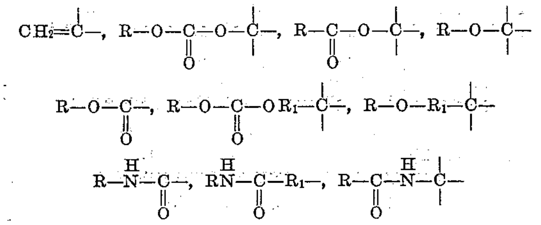

where R contains a polymerizable unsaturated carbon-carbon group and $R_1$ is a linking group having a carbon atom which is linked directly to an ether carbon atom. Thus this intermediate polymer may be considered to be a polyunsaturated polyethylene oxide type polymer of an unsaturated compound which contains an ethylene oxide group and a polymerizable unsaturated aliphatic carbon-carbon group which is linked to the ethylene oxide group through a carbon atom which is adjacent to one of the carbon atoms of the ethylene oxide group.

This type of intermediate polymer also may be regarded as a polyglycol type polymer derived from a substituted ethylene glycol having an unsaturated polymerizable group of the type above mentioned. Thus these polymers may be considered to be polymers of an alcohol which has at least three carbon atoms in a single uninterrupted chain, an alcoholic hydroxyl group attached to each of two adjacent carbon atoms in the chain and which has a polymerizable unsaturated aliphatic carbon-carbon group linked to one of the two carbon atoms through the third carbon atom of the chain.

The polymeric unsaturated ethers of this type may be prepared by polymerizing the epoxy group of the compounds herein contemplated under conditions such that little or no polymerization of the unsaturated group takes place. For example, glycidol methacrylate or butadiene monoxide (1,2 epoxy butene-3) may be subjected to conditions to cause polymeric etherification. This may be accomplished by heating this type of compound in the presence of small quantities, usually less than one percent by weight based upon the weight of the unsaturated epoxide, of an acid or alkaline condensation agent or catalyst such as stannic chloride, aluminum chloride, ferric chloride, titanium tetrachloride, toluene sulphonic acid, metallic sodium or potassium, caustic soda, caustic potash; trimethyl amine, quinoline, boron trifluoride, acid treated clays, or other HCl or other acid washed active silica stannic ethylate or other condensation catalyst to cause the desired polymerization. In such a case long chain polymeric ethers are formed which contain a plurality of polymerizable group such as the group $$CH_2=\overset{|}{C}-$$

These unsaturated polymeric ethers form in many cases even when the condensation catalyst shows some tendency to polymerize the unsaturated group since the latter polymerization in these cases normally proceeds at a slower rate.

Where desirable, inhibitors such as cuprous chloride, hydroquinone, phenylene diamine or other compound, capable of inhibiting polymerization of a peroxide polymerizable unsaturated group such as the group $CH_2=CH-$ or similar group, or of inhibiting the catalytic effect of a peroxide catalyst may be maintained present in small amount (usually less than 0.1 percent by weight of the epoxy compound). After the polymeric ether has been formed, this inhibitor, if used, may be washed out, if necessary, and the resulting unsaturated ether may be processed and further polymerized as hereinafter described.

Intermediate polymers of the second named class are obtained by treatment of the unsaturated epoxy compound to cause polymerization of the unsaturated group without substantial formation of ether linkages by virtue of the polymerization of the epoxy group. In many cases the polymerization of the unsaturated groups may be effected by catalytic procedures which catalyze polymerization of this character such as by subjecting the compound to ultraviolet light or by heating in the presence of oxygen, ozone or peroxy catalysts such as organic or inorganic peroxides including benzoyl peroxide, acetyl peroxide, lauroyl peroxide, acetone peroxide, acetyl acetone peroxide, acetyl acetonyl peroxide, peroxy dicarbonates such as isopropyl peroxy dicarbonate, ethyl peroxy dicarbonate, n-butyl peroxy dicarbonate, etc. hydrogen peroxide, potassium persulfate and other catalyst particularly peroxy catalysts which are capable of catalyzing polymerization of unsaturated carbon-carbon groups. Polymers so obtained are polyepoxides of a polymerized vinyl or similar compound and usually have the general structure $$\left[-\overset{|}{C}-\underset{\underset{R}{|}}{\overset{|}{C}}-\right]_n$$

where R is a radical having an ethylene oxide group and $n$ is a number denoting the number of units of the polymer usually being above 5 or 10 and frequently being 50 or more.

It has been found, according to this invention that many catalysts particularly oxygen, ozone, or peroxy compounds which catalyze polymerization of the unsaturated carbon-carbon groups herein contemplated do not catalyze polymerization of epoxy groups. In like manner many catalysts which promote polymerization of the epoxy group do not catalyze the polymerization of the unsaturated carbon-carbon groups herein contemplated at least under the conditions necessary for polymerization of the epoxy groups.

Certain catalysts for polymerization of epoxy groups exert a catalytic action tendency to polymerize olefin groups. Sodium boron trifluoride and stannic chloride are illustrative of this type of catalyst. However, the rates of polymerization of the epoxy groups and the olefin groups are different and the two types of polymerization generally require different temperatures and/or pressures. Hence, it is usually possible to effect polymerization of one of the groups to a major extent without forming an insoluble or infusible polymer due to cross linkage by virtue of polymerization of the other type of group. In a case of this type some polymerization of the both groups may tend to occur. If simultaneous polymerization of both groups occurs to an excessive degree an essentially infusible or at least quite insoluble polymer will be produced. However, if but a minor amount of polymerization of one of the groups occurs during polymerization of the other group, a polymer which is fusible, at least under pressure, but which may be relatively insoluble may be obtained. This fusible insoluble polymer may be molded or similarly processed although not as effectively as a polymer in which but one type of polymerization has occurred exclusively. Moreover, it is preferable that even in such cases the intermediate polymer contain at least some portion, preferably at least 20 to 30 percent by weight of a soluble fusible polymer of the unsaturated epoxide.

The above described intermediate polymers may be treated by any convenient process to form a desired article and after or during processing may be converted to a three dimensional or cross linked state by polymerization of the remaining groups or a major portion of them. Thus these intermediate polymers may be molded, applied as a coating, cast or otherwise processed to the desired shape or physical state and then further polymerized. If necessary the catalyst may be separated from the intermediate polymer in order to prevent premature conversion to a cross linked state of polymerization. More commonly, however, the catalyst necessary for conversion of the polymer to this state is added prior to the processing and the composition containing the catalyst is molded or used as a coating or impregnating composition. In molding in such cases curing and molding may occur simultaneously. However, the various molding, coating or other operations may be performed at temperatures below which further polymerization tends to occur or at a rate such that the desired operation is completed before the polymerization has proceeded to the point where further shaping or similar operation is impracticable.

A wide variety of compounds containing a single epoxy group and one or more unsaturated polymerizable carbon-carbon groups or a single unsaturated group and one or more epoxy groups may be polymerized according to this invention. There are a wide variety of compounds which polymerize by virtue of their unsaturation. In general they are compounds which contain the groups —C=C—, —C≡C—, —C=C—C=C—, or —C≡C—C=C—

The present invention contemplates polymerization of compounds which contain a polymerizable ethylene oxide group and a polymerizable unsaturated group of this type linked together in the same molecule. In general it is found preferable that the ratio of the number of carbon atoms in the compound to be polymerized to the total number of unsaturated polymerizable groups and polymerizable epoxy groups in the compound should not exceed about 15.

The invention is particularly applicable to the polymerization of epoxy compounds which contain an unsaturated polymerizable carbon-carbon linkage which is associated with the second carbon atom from the linking oxygen or nitrogen atom of an ester or ester amide linkage. Thus, the invention is particularly applicable to compounds which contain the polymerizable groups

C=C—O—C(=O)—, —C=C—C—O—C(=O)—

—C=C—C(=O)—O, C≡C—C(=O)—O—

Epoxy compounds containing these groups and capable of polymerization as herein contemplated include:

Esters of polymerizable unsaturated acids such as alpha beta unsaturated monocarboxylic acids, for example acrylic, methacrylic, alpha or beta chloroacrylic, linoleic and cinnamic acids or China-wood oil acids and epoxy monohydric alcohols such as glycidol, 3,4-epoxy butanol-1,2,3-4,5-diepoxy pentanol-1, beta methyl glycidol or beta phenyl glycidol. Compounds of this type include glycidol acrylate, glycidol linoleate, or glycidol methacrylate which are typical esters of this type.

Mixed esters of alpha beta dicarboxylic acids such as maleic, fumaric, itaconic, or citraconic acids and: (1) a saturated or unpolymerizable monohydric alcohol such as methyl, ethyl, n-propyl, isopropyl, n-butyl, isobutyl, amyl, stearyl, octyl, lauryl, benzyl or cyclohexyl alcohol or phenol and (2) an epoxy monohydric alcohol such as above mentioned. Such compounds include ethyl glycidol maleate, ethyl glycidol fumarate; ethyl glycidol itaconate, glycidol octyl maleate, glycidol stearyl maleate, glycidol cyclohexyl maleate, or beta methyl glycidol ethyl maleate.

Esters of epoxy monocarboxylic acids such as glycidic acid or 2,3 epoxy butyric acid and an alpha-beta or beta-gamma unsaturated alcohol such as allyl, methallyl, 2 chloroallyl, 2 ethyl allyl, propargyl or cinnamyl, alcohols, or methyl vinyl carbinol, 3-chloro-butene-2-ol-1, furfuryl alcohol, etc. Such esters include allyl 2,3-epoxybutyrate, allyl 2,3-epoxy-1-propionate, butadienyl 2,3-epoxy butyrate or the vinyl, allyl or methallyl or propargyl esters of these acids or of alpha methyl glycidic acid or beta methyl glycidic acid, dimethyl glycidic acid or beta phenyl glycidic acid.

Mixed esters of a glycol or other polyhydric alcohol and an epoxy monocarboxylic acid such as glycidic acid or 2,3 epoxy butyric acid and a polymerizable unsaturated monocarboxylic acid such as acrylic, methacrylic, alpha chloroacrylic, or propiolic acids. Such esters include the glycidic ester of ethylene glycol monoacrylate, or diethylene glycol monoacrylate, or glycerol diacrylate, and the corresponding methacrylic or chloroacrylic esters.

Polyesters of epoxy monohydroxy alcohols such as glycidol, beta methyl glycidol or beta phenyl glycidol and alpha beta unsaturated dicarboxylic acids such as bis glycidol fumarate, bis glycidol maleate, bis glycidol itaconate, etc. Mixed esters of dicarboxylic acids and an epoxy monohydroxy alcohol such as listed above and an unsaturated monohydric alcohol containing up to 5 carbon atoms and an unsaturated carbon-carbon bond involving the beta carbon atom of the alcohol. Esters of this type include glycidol allyl phthalate, glycidol methallyl phthalate, glycidol allyl succinate, glycidol allyl adipate, glycidol vinyl carbonate, and the corresponding esters of other epoxy monohydric alcohols. Esters of epoxy monohydric alcohols such as glycidol beta methyl glycidol or beta phenyl glycidol and unsaturated dibasic acids such as bis glycidol maleate, bis glycidyl fumarate, allyl glycidyl phthalate, allyl glycidyl succinate, etc.

Esters of epoxy acids such as glycidic acid, alpha methyl glycidic acid, beta methyl glycidic acid or 2,3-epoxy butyric acid and unsaturated glycols such as the ester of erythrol and glycidic acid, erythrol di-2,3-epoxy butyrate, etc.

The above compounds are valuable for use according to this invention since they polymerize readily under the influence of peroxy catalysts (which do not promote polymerization of epoxy groups) and are not readily polymerized by catalysts which promote epoxy group polymerization.

A wide variety of other compounds are capable of use for preparation of the herein contemplated polymers including:

Epoxy olefins such as butadiene monoxide, isoprene monoxide, chloroprene monoxide, 4-vinyl cyclohexene monoxide, or p-epoxy ethyl styrene. Mixed ethers of polymerizable unsaturated alcohols and epoxy alcohols such as glycidol. Such ethers include glycidyl allyl ether, glycidyl vinyl ether, glycidol methallyl ether, the methyl vinyl carbinyl ether of beta phenyl glycidol, the allyl ether of beta methyl glycidol, etc.

It will be noted that certain of the above listed compounds contain more than one unsaturated or more than one epoxy polymerizable group. As stated previously it is preferred to deal with compounds which contain but a single unsaturated group and a single epoxy group since the presence of more than one of each group limits the type of polymerization processes which may be used. Thus if a compound containing two unsaturated polymerizable groups or two epoxy groups is polymerized, the production of an intermediate polymer becomes more difficult. Intermediate polymers can be formed in such cases but the polymers are relatively low in molecular weight. Moreover, the conversion of the intermediate polymer to its insoluble or infusible state with such polymers merely involves further polymerization of the same group. An advantage which may be achieved when a compound having but a single unsaturated and a single epoxy group is that one type of polymerization may be carried out essentially to completion thereby producing a relatively strong two dimensional type polymer. This polymer may be converted to an infusible or at least to a three dimensional state by the second type of polymerization. It will be apparent that similar methods may be applied to compounds which contain but one polymerizable unsaturated group and more than one epoxy group or vice versa but the same advantages do not accrue if the compound contains more than one of each group insofar as production of intermediate polymers are concerned although the final polymer in such a case may be essentially similar. Thus compounds containing but one unsaturated group and two or more epoxy groups may be treated to polymerize first the unsaturated group and, conversely, compounds containing but one epoxy group and two or more polymerizable unsaturated groups may be treated to polymerize the epoxy group first.

Polymers of the above compounds in which an epoxy group and an unsaturated group thereof both are polymerized may be prepared directly by conducting the polymerization in the presence of an oxygen catalyst and a condensation catalyst in a single operation. Cast polymers may be prepared in this manner by placing the monomer in a casting cell and polymerizing.

The production of intermediate polymers which contain unpolymerized groups is of especial advantage. As previously noted, intermediate polymers may be prepared by polymerization of the epoxy group without substantial polymerization of the unsaturated group and vice versa. Other intermediate polymers may be secured by polymerizing both groups at the same time and interrupting polymerization when a soluble fusible or insoluble fusible polymer has been secured.

These intermediate polymers are apparently long chain two dimensional type polymers which are fusible and usually are soluble in organic solvents. The polymers derived by polymerization of the epoxy groups leaving unsaturated groups unpolymerized are generally soluble in alcohols, ethers and ketones such as methyl alcohol, ethyl alcohol, acetone, diethyl ether, xylene, toluene, etc. The polymers secured by polymerization of the unsaturated groups leaving epoxy groups unpolymerized are generally insoluble in water and alcohols such as methyl or ethyl alcohol but are soluble in ketones, ethers and similar solvents such as acetone, chloroform, methyl ethyl ketone, xylene, toluene, etc. If the polymerization is incomplete this latter type polymer may be separated as a precipitate or plastic mass from monomer by addition of alcohols such as ethyl or methyl alcohol to a solution of the polymer and monomer. Both types of polymers may be separated from unpolymerized material by addition of water or similar nonsolvent to a solution of the intermediate polymer. Whenever a nonsolvent is added to the intermediate polymer or a solution thereof the precipitated polymer may be recovered by filtration, decantation, etc.

The intermediate polymers vary in character from viscous liquids to solids depending upon the degree of polymerization and the concentration of monomer present. They may be cast polymerized to form transparent castings. They may be applied to metal, wood, paper, stone or other bases as coatings. They may be molded to a desired shape. They may be used to impregnate laminated fibrous sheets such as sheets of paper woven or felted glass cloth, duck, muslin or other cotton fabric, nylon, silk, etc. If necessary these polymers may be heated, with or without pressure, to a temperature sufficiently high to cause solid particles of polymer to merge or knit together to form an essentially continuous polymer phase. If necessary catalysts may be removed from the intermediate polymer prior to these fabrication operations in order to prevent premature conversion. Stannic chloride and similar catalysts may be removed by washing a solution of the polymer with water and separating the aqueous phase from the polymer. Peroxide catalysts frequently may be removed by precipitation of the polymer from an acetone solution thereof with methanol.

After processing of the intermediate polymer has been completed, the polymer may be further polymerized to convert the unpolymerized groups. Usually this is accomplished by adding catalyst for the unpolymerized groups to the intermediate polymer before or during processing of the polymer and then heating the processed polymer at a temperature at which the catalyst is active. However, in some cases the required catalyst may be maintained present from the time of initial polymerization.

After polymerization to a final state a polymer is secured which is insoluble in organic solvents. When the compound undergoing polymerization contains actively polymerizable groups, this final polymer frequently is infusible or only slightly fusible at atmospheric pressure although it may exhibit plastic flow under application of superatmospheric pressures. The following examples are illustrative:

*Example 1*

Glycidyl methacrylate was prepared in the following manner. A mixture of 37 grams of glycidol, 47.4 grams of pyridine and 200 milliliters of benzene was placed in a reaction flask provided with a cooling bath. Methacrylyl chloride, 57.5 grams was slowly added dropwise to the mixture with stirring over a period of two hours while the temperature of the mixture was maintained at about 0° C. The mixture was then stirred for one half hour, washed six times with equal volumes of water and was dried over anhydrous sodium sulfate. Upon fractionation of the mixture, glycidol methacrylate was obtained. This ester was a liquid which boils at 81–83° C. at 10 millimeters pressure and an index of refraction $n_D^{20}$ of 1.4485.

Glycidol methacrylate containing 0.5 percent by weight of anhydrous stannic chloride was heated at 70° C. for 72 hours and an acetone soluble gum was obtained. This gum may be molded to any convenient shape. 0.5 percent by weight of benzoyl peroxide was mixed with the acetone soluble polymer and the mixture was heated for three hours at 70° C. The gum became homogeneous during the heating and was converted to a hard clear acetone insoluble polymer.

*Example 2*

Glycidol methacrylate when heated with 1 percent by weight of benzoyl peroxide at 70° C. for one hour polymerized to form a hard acetone soluble resin. When this resin is dissolved in acetone, precipitated with methanol, mixed with 0.5 percent by weight of potassium ethoxide or 0.5 percent by weight of stannic chloride and fused and heated at 100° C. for 72 hours, a hard acetone insoluble essentially infusible polymer is produced.

*Example 3*

A quantity of allyl 2,3-epoxy-butyrate was prepared by the following procedure: 86 grams of crotonic acid and 500 grams of water was placed in a flask and one mole of HOCl, as aqueous solution of hypochlorous acid containing 150 grams of HOCl per liter of solution, was added dropwise over a period of one hour while maintaining the temperature of the mixture at 0 to 10° C. The resulting solution was saturated with sodium chloride and extracted with ether and the ether evaporated from the extract.

To 145 grams of the resulting 2-chloro-3-hydroxy-butyric acid was added 700 milliliters of a solution containing 20 percent by weight of potassium hydroxide in absolute alcohol a persistent phenolphthalein end point being given by the reaction mixture when the addition was complete. The temperature was allowed to rise to 45° C. over the half hour period of the addition. Carbon dioxide was introduced into the mixture until excess base was neutralized and the precipitate was filtered off and washed with 150 milliliters of hot absolute alcohol. The alcoholic filtrates were combined and mixed with 200 milliliters of ether whereupon potassium 2,3-epoxybutyrate was precipitated.

100 grams of potassium 2,3-epoxy butyrate was dissolved in 300 milliliters of water and added to 100 grams of silver nitrate in 200 milliliters of water and the resulting white silver salt precipitated. This product was recovered by filtration and washing.

Into a 500 milliliter flask were placed 41.8 grams of the silver 2,3-epoxybutyrate, 24.2 grams of allyl bromide and 250 milliliters of benzene. The mixture was refluxed for 4 hours. The solid was filtered off and the filtrate was fractionated and allyl 2,3-epoxybutyrate, a liquid boiling at 100–101° C. at 26 millimeters pressure and having a density $d_4^{25}$ of 1.0432 was obtained.

Allyl 2,3-epoxybutyrate containing 5 percent by weight of benzoyl peroxide was heated for 15 hours at 70° C. and a colorless very viscous acetone soluble liquid was produced. This liquid was converted to an acetone insoluble essentially infusible polymer by adding 5 percent by weight anhydrous stannic chloride and heating the mixture for 22 hours.

*Example 4*

Allyl 2,3-epoxybutyrate was heated with 4 percent by weight of $BF_3.2H_2O$ at 70° C. for 20 hours and a viscous methanol soluble liquid was obtained. This product was mixed with 5 percent by weight benzoyl peroxide and was heated in a casting cell at 70° C. for 23 hours to form a solid insoluble polymer.

*Example 5*

Vinyl ethylene oxide (butadiene monoxide) was mixed with a small quantity of 38% $SnCl_4.5H_2O$ in ethanol in the proportion of 0.66 part by weight of the solution to 8.9 parts by weight of vinyl ethylene oxide and the temperature was maintained at 0° C. during the addition and thereafter was allowed to warm to room temperature whereupon heat was evolved and a gel was formed. The product was further heated at 70° C. for 25 hours and allowed to stand at room temperature for 5 days and was then heated for 17 hours at 90–100° C. This product was a mixture of acetone soluble polymer and insoluble gel. Acetone soluble polymer could be extracted from the insoluble polymer with acetone.

A solution of this acetone soluble polymer in the proportion of about 3 grams of polymer to 4.5 grams of acetone and containing 4 percent by weight (based upon the weight of polymer) of benzoyl peroxide was prepared and used as a coating composition to apply films upon a glass base and the films were dried and baked at a temperature gradually using over one hour to 115° C. and then at 135° C. for 14 hours. The films thus obtained were unaffected by chloroform and acetone and were hard.

*Example 6*

The process of Example 5 was repeated using 1% sodium ethoxide in lieu of stannic chloride as a catalyst and a similar hard insoluble essentially nonfusible polymer was obtained. The molecular weight of the vinyl polyethylene oxide prepared by the polymerization of sodium ethoxide was found to have a molecular weight of about 850.

Although the present invention has been described with reference to the specific details of certain embodiments thereof it is not intended that such details shall be regarded as limitations upon the scope of the invention except insofar as included in the accompanying claims.

What is claimed:

1. Allyl 2,3 epoxy butyrate.
2. A polymer of allyl 2,3 epoxy butyrate.

References Cited in the file of this patent

UNITED STATES PATENTS

| Number | Name | Date |
|---|---|---|
| 2,160,943 | Britton | June 6, 1939 |
| 2,189,529 | Carothers | Feb. 6, 1940 |
| 2,399,214 | Evans | Apr. 30, 1946 |
| 2,403,344 | De Groote | July 2, 1946 |
| 2,450,234 | Evans | Sept. 28, 1948 |
| 2,470,324 | Staudinger et al. | May 17, 1949 |
| 2,476,922 | Shokal et al. | July 19, 1949 |
| 2,524,432 | Dorough | Oct. 3, 1950 |

OTHER REFERENCES

Pummerer et al., Berichte 66B, pages 335–9 (1933).

Beilstein, vol. XVIII, pages 261, 262 (Berlin, 1934).

Schildknecht, "Vinyl and Related Polymers," page 706.